US011676193B1

(12) United States Patent
VisentiniScarzanella et al.

(10) Patent No.: US 11,676,193 B1
(45) Date of Patent: Jun. 13, 2023

(54) OPTIMIZING DIVERSITY AND RELEVANCE FOR CATALOG ITEMS

(71) Applicant: Amazon Technologies, Inc., Seattle, WA (US)

(72) Inventors: Marco VisentiniScarzanella, Shinagawa-ku (JP); Nobuyuki Morioka, Kawasaki (JP)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 16/680,262

(22) Filed: Nov. 11, 2019

(51) Int. Cl.
| | |
|---|---|
| G06Q 30/00 | (2023.01) |
| G06Q 30/0601 | (2023.01) |
| G06F 18/22 | (2023.01) |
| G06F 18/2115 | (2023.01) |
| G06F 18/2413 | (2023.01) |
| G06N 3/045 | (2023.01) |

(52) U.S. Cl.
CPC ..... *G06Q 30/0631* (2013.01); *G06F 18/2115* (2023.01); *G06F 18/22* (2023.01); *G06F 18/24147* (2023.01); *G06N 3/045* (2023.01); *G06Q 30/0603* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 9,665,902 B2 | 5/2017 | Lee et al. | |
| 9,734,503 B1 | 8/2017 | Gargi | |
| 9,959,563 B1 * | 5/2018 | Wu | G06Q 30/0631 |
| 10,019,747 B2 | 7/2018 | Hu et al. | |
| 10,127,596 B1 * | 11/2018 | Franke | G06Q 30/0627 |
| 10,332,187 B2 | 6/2019 | Abuelsaad et al. | |
| 10,339,538 B2 | 7/2019 | Souders et al. | |
| 10,373,230 B2 | 8/2019 | Walti et al. | |
| 10,380,123 B2 | 8/2019 | Carlyle | |

(Continued)

OTHER PUBLICATIONS

Zheng Qin, "Introduction to E-commerce", 2009, Springer, springer.com (Year: 2009).*

(Continued)

*Primary Examiner* — Michelle T Kringen
*Assistant Examiner* — Norman Donald Sutch, Jr.
(74) *Attorney, Agent, or Firm* — Robert C. Kowert; Kowert, Hood, Munyon, Rankin & Goetzel, P.C.

(57) ABSTRACT

Methods, systems, and computer-readable media for optimizing diversity and relevance for catalog items are disclosed. Respective target metrics are determined for a plurality of categories comprising a plurality of items in an electronic catalog. First and second categories comprise first and second subsets of the plurality of items, and the respective target metric for the first category is determined using aggregation of individual target metrics for the first subset. Respective similarity scores are determined between pairs of the categories. N item categories are selected from the plurality of categories based at least in part on the respective target metrics and based at least in part on the respective similarity scores. A third subset of the plurality of items is selected from across the N item categories, including the first and second categories. The selected items optimize both category diversity and item relevance.

17 Claims, 6 Drawing Sheets

(56) References Cited

U.S. PATENT DOCUMENTS

| | | | | |
|---|---|---|---|---|
| 10,796,321 | B1* | 10/2020 | Balakrishnan | G06Q 30/0631 |
| 11,250,488 | B1* | 2/2022 | Rao | G06F 16/904 |
| 2008/0270398 | A1* | 10/2008 | Landau | G06Q 30/02 |
| 2009/0055257 | A1* | 2/2009 | Chien | G06Q 30/0273 |
| | | | | 705/14.69 |
| 2010/0268661 | A1* | 10/2010 | Levy | G06Q 30/02 |
| | | | | 705/347 |
| 2011/0010324 | A1* | 1/2011 | Bolivar | H04L 67/306 |
| | | | | 706/46 |
| 2014/0279190 | A1* | 9/2014 | Severinghaus | G06Q 30/0631 |
| | | | | 705/26.7 |
| 2019/0034994 | A1* | 1/2019 | Wu | G06Q 30/0631 |
| 2019/0130148 | A1* | 5/2019 | Chinya | G06K 7/10722 |
| 2020/0104898 | A1* | 4/2020 | Cui | G06Q 30/0631 |
| 2020/0211080 | A1* | 7/2020 | Frederick | G06Q 10/02 |

OTHER PUBLICATIONS

Peizhe Cheng et al; "Learning to Recommend Accurate and Diverse Items"; Apr. 2017; International World Wide Web Conference Committee (IW3C2) (Year: 2017).*

Alfred M. Bruckstein et al., "From Sparse Solutions of Systems of Equations to Sparse Modeling of Signals and Images." Society for Industrial and Applied Mathematics (SIAM) Review, vol. 51, No. 1, pp. 34-81. Feb. 2009.

Sumit Chopra et al., "Learning a Similarity Metric Discriminatively, with Application to Face Verification." In the Proceedings of the 2005 IEEE Computer Society Conference on Computer Vision and Pattern Recognition (CVPR'05), vol. 1, pp. 539-546. Jun. 2005.

Tomas Mikolov et al., "Efficient Estimation of Word Representations in Vector Space." Proceedings of Workshop at ICLR. Jan. 2013.

Thomas Nedelec et al., "Content2Vec: Specializing Joint Representations of Product Images and Test for the Task of Product Recommendation." OpenReview.net. Nov. 2016.

Florian Schroff et al, "FaceNet: A Unified Embedding for Face Recognition and Clustering." 2015 IEEE Conference on Computer Vision and Pattern Recognition (CVPR), pp. 815-823. Mar. 2015.

Laurens van der Maaten et al., "Visualizing High-Dimensional Data Using t-SNE." Journal of Machine Learning Research, 9(11), pp. 2579-2605. Nov. 2008.

Laurens van der Maaten et al., "Stochastic Triplet Embedding." IEEE International Workshop on Machine Learning for Signal Processing. 2012.

John Wright et al., "Sparse Representation for Computer Vision and Pattern Recognition." Proceedings of the IEEE, vol. 98, No. 6, pp. 1031-1044. Mar. 2009.

Bolei Zhou et al., "Learning Deep Features for Scene Recognition using Places Database." Conference on Neural Information Processing Systems (NIPS). Dec. 2014.

* cited by examiner

OPTIMIZING DIVERSITY AND RELEVANCE FOR CATALOG ITEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's website to view and purchase goods and services offered for sale by a set of vendors. Some web-accessible stores include large electronic catalogs of items offered for sale. For each item, such electronic catalogs typically include at least one product detail page that specifies various information about the item, such as a description of the item, one or more pictures of the item, as well as specifications (e.g., weight, dimensions, capabilities) of the item. A distributed system may include many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for optimizing item diversity and relevance for catalog items are described. An electronic catalog may contain millions of descriptions of different items. The items may be classified into a variety of different categories such as health products, baby products, books, food, streaming audio, streaming video, and so on. In some embodiments, the items may be offered by a variety of merchants. Customers may search for particular items or browse item categories in order to purchase, rent, lease, or otherwise engage in a transaction regarding a particular item with a merchant. Customers may not always know how to find desired items in the electronic catalog or may want to be inspired via personalized suggestions or recommendations of items. Prior solutions for personalized product recommendations have tended to rely on customer purchase history. However, such approaches may generate product recommendations that are overly specific, redundant, or otherwise unwanted by the customer. For example, if the customer recently purchased a high-end camera, then recommendations based on the customer's purchase history may include other high-priced cameras even though the customer is unlikely to purchase such another such item so soon after the recent purchase. As another example, if the customer's purchase history is too sparse to draw conclusions about the customer's tastes, then recommendations based on the customer's purchase history may include many irrelevant items.

Using the techniques described herein, recommendations of items in an electronic catalog may be generated such that category diversity and item relevance are jointly maximized, optimized, or otherwise improved in comparison to prior approaches. A product recommendation system may take, as input, a list or set of item identifiers (IDs) along with target metrics for those item IDs. A target metric for an item may tend to indicate that item's relevance to customers. A target metric may be based on frequency of repurchase, aggregate revenue over a period of time, number of purchased units, and/or other indicators of item relevance. The target metric may be defined by a client of the product recommendation system, e.g., by an entity associated with the electronic catalog that seeks to improve sales or otherwise drive customer engagement via product recommendations. The product recommendation system may determine aggregate target metrics for item categories to which items in the input list belong. The aggregate target metrics may tend to indicate that category's relevance to customers. The product recommendation system may also determine similarity scores or distances between pairs of categories, e.g., as represented in a Euclidean distance matrix. The similarity scores or distances may be determined based (at least in part) on mutual views for pairs of categories, mutual purchases for pairs of categories, and so on. Using a sparse coding technique, the product recommendation system may select a set of N categories such that category diversity (as indicated by the similarity scores or distances) and relevance (as indicated by the aggregate target metrics) are jointly maximized. The sparse coding technique may use a dictionary of narrow kernels or windows centered at each category in a category embedding space in an effort to reconstruct the category popularity (target metric) signal with a fixed number of N positive elements. The selected categories may be distant in the embedding space in order to enforce category diversity and variety. A set of recommended items may be selected from the N selected categories. For example, the top M items (as ranked by the target metric) may be selected from each of the N categories, where N represents two or more categories and M represents one or more items from each category. The selected set of recommended items may eliminate redundancies while also including a diverse and varied set of items for which customers have previously shown a high propensity to purchase, rent, or lease, or other high degree of interest.

As one skilled in the art will appreciate in light of this disclosure, embodiments may be capable of achieving certain technical advantages, including some or all of the following: (1) improving the speed of using computers to generate lists of items from multiple categories while jointly maximizing two different metrics; (2) improving the ability of computers to display relevant information to users in a space-constrained user interface, e.g., using item selections that maximize category diversity and item relevance; (3) improving the scalability and performance of generating product recommendations across a large electronic catalog by filtering category pairs that are excessively distant; (4) improving the scalability and performance of generating product recommendations across a large electronic catalog by using similarity scores between categories without necessarily computing category embeddings in an embedding space; and so on.

Figure 1:
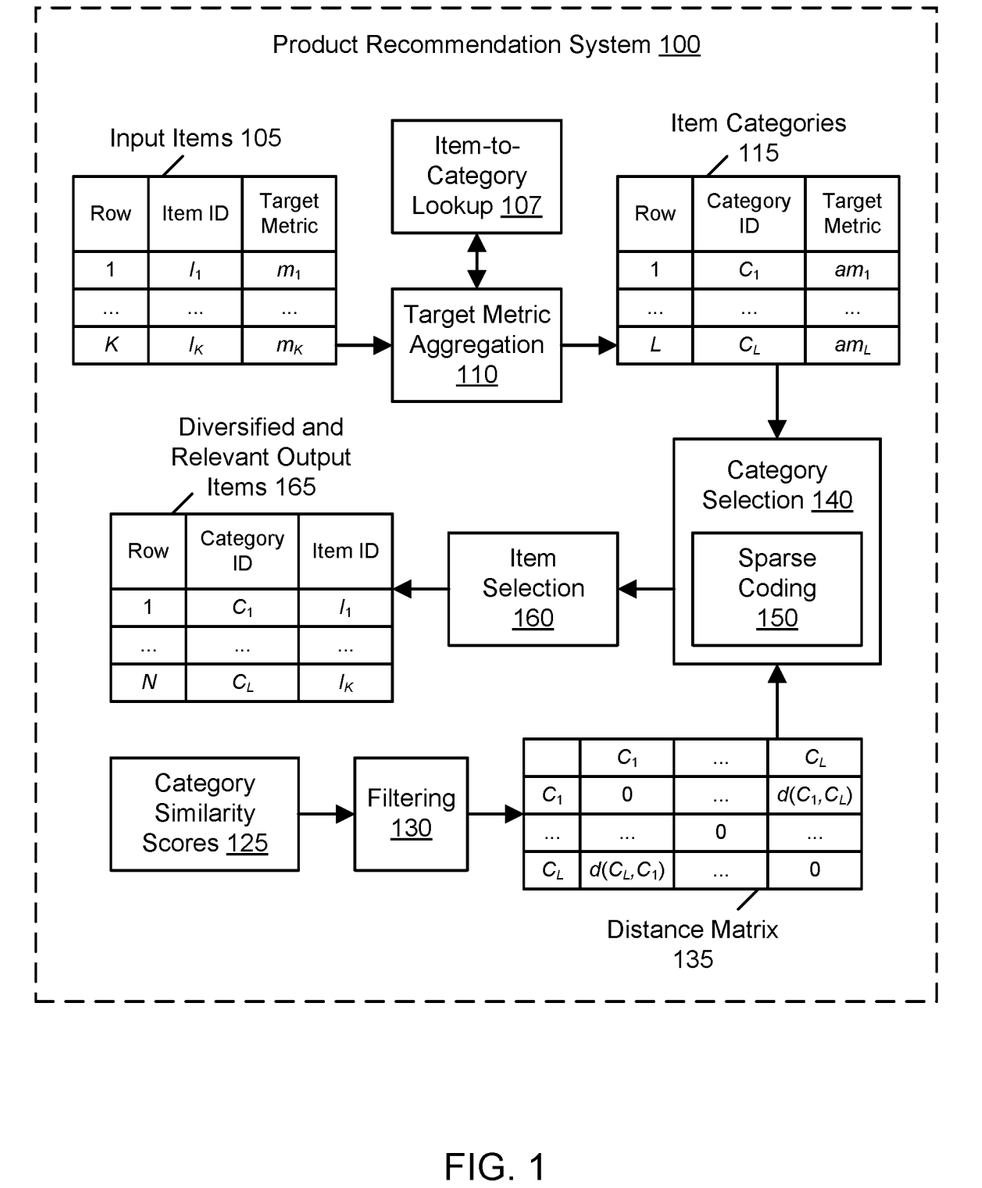
FIG. 1 illustrates an example system environment for optimizing diversity and relevance for catalog items, according to some embodiments.

FIG. 1 illustrates an example system environment for optimizing diversity and relevance for catalog items, according to some embodiments. A product recommendation system 100 may take a set of items 105 as input and produce a smaller set of items 165 as output. The input items 105 may belong to a variety of categories of an electronic catalog. As discussed above, the electronic catalog may contain millions of descriptions of different items in many different categories. Categories may be referred to as item categories. Examples of categories may include health products, baby products, books, food or grocery items, mobile phones, laptop computers, streaming audio, streaming video, and so on. Categories may be organized in a hierarchy, e.g., with some categories representing root nodes in a tree-like data structure, other categories representing intermediate nodes with both parents and children, and yet other categories representing leaf nodes with no children. In some embodiments, a given item may belong to (or be classified in) more than one category. For example, a particular model of mobile phone may be classified in a mobile phone category as well as an electronics category. Some categories may be more closely related than others. For example, the mobile phone category may be closer or more similar to the electronics category than to the health products category, while the health products category may be closer or more similar to the baby products category than to the book category.

Using the product recommendation system 100, a set of items 165 may be selected from a diverse and varied set of categories in the electronic catalog. The set of items 165 may also represent items in which customers have shown a high degree of interest or other propensity to purchase. The diverse and relevant set of items 165 may be selected in order to optimize the display of a relatively small number of suggested items in a space-constrained user interface element, e.g., a "suggested purchases" pane or widget on a product detail page associated with the electronic catalog. Such an interface element may improve the experience of customers of the electronic catalog, e.g., by allowing them to discover items of interest while reducing the display of irrelevant or redundant items.

The selection of the output items 165 based (at least in part) on the input items 105 may be invoked by a request from a client of the system 100. In some embodiments, the client may seek the selection of items 165 in order to provide a list of recommended products to users. The product recommendation system 199 may take, as input, a list or set of product identifiers (IDs) 105 along with target metrics for those product IDs. In some embodiments, each of the input items 105 may be associated with a target metric. A target metric for an item may tend to indicate that item's relevance to customers. A target metric may be based on frequency of repurchase, aggregate revenue over a period of time, a total number of purchased units, and/or other indicators of item relevance. The target metric may be defined by a client of the product recommendation system 100, e.g., by an entity associated with the electronic catalog that seeks to improve sales or otherwise drive customer engagement via product recommendations. The output items 165 may be selected from different categories such that both the category diversity and relevance (according to the target metric) of the selected items are optimized, maximized, or otherwise improved in comparison to the input items or to selections made with prior approaches.

The input items 105 may include a list or set of K items such as items $I_1$ (with target metric $m_1$) through $I_K$ (with target metric $m_K$). Using a component for target metric aggregation 110, the product recommendation system 100 may determine aggregate target metrics for item categories to which items in the input list belong. The resulting set of item categories 115 may include a list or set of L items such as categories $C_1$ (with aggregate target metric $am_1$) through $C_L$ (with target metric $am_K$). The target metric aggregation 110 may use a component 107 for item-to-category lookup in order to determine a category associated with each of the K items. Aggregate target metrics may then be calculated for the L categories to which the K items belong. For example, if five different items including item $I_1$ belong to category $C_1$ in the input items 105, then the aggregate metric $am_1$ for category $C_1$ may be calculated using the five individual metrics (including metric $m_1$) of those five items. In some embodiments, an aggregate target metric may be determined as a mean or average of the individual target metrics. However, any suitable aggregation function may be used. The aggregate target metric for a category may tend to indicate that category's relevance to customers in comparison to other categories. For example, depending upon the selection of the target metric, a category such as baby products with frequently repurchased items may generally be more "relevant" (based on aggregate target metrics) than a mobile phone category with infrequently repurchased items.

The product recommendation system 100 may also determine similarity scores 125 for pairs of categories. The similarity scores 125 may indicate similarities between pairs of the L categories determined by the target metric aggregation 110. The similarity score 125 for a pair of categories may tend to indicate the distance between the two categories. For example, a similarity score for the mobile phone category and a health products category may indicate a lower similarity or higher distance, while a similarity score for the mobile phone category and the electronics category may indicate a higher similarity or lower distance. In some embodiments, the similarity scores 125 may be based (at least in part) on analysis of a category hierarchy. However, in some embodiments, similarity scores may be generated on other data. In some embodiments, the similarity scores 125 or distances may be determined based (at least in part) on mutual views for pairs of categories, mutual purchases for pairs of categories (e.g., per session-day), and so on. As will be discussed below with respect to FIG. 4, the similarity scores 125 may be used to compute category embeddings 400 in an embedding space in some embodiments. However, the system 100 may produce the output items 165 without computing the embeddings 400 in some embodiments.

In some embodiments, the system 100 may perform filtering 130 on the category similarity scores 125, e.g., in order to remove pairs of categories that are excessively distant or otherwise create a more focused set of similarity scores. In some embodiments, the system 100 may generate a distance matrix or similarity matrix 135 based (at least in part) on the similarity scores. The matrix 135 may represent a Euclidean distance matrix. As shown in FIG. 1, the matrix 135 may include a row and column for each of the L categories, where the distance between a category and itself is zero, the distance between a category $C_1$ and a category $C_L$ is $d(C_1, C_L)$, and the distance between a category $C_L$ and a category $C_1$ is $d(C_L, C_1)$. The matrix 135 may be made symmetric such that the distance between category $C_1$ and category $C_L$ is the same as the distance between category $C_L$ and category $C_1$.

The product recommendation system 100 may use both the aggregate target metrics for item categories 115 and the distance matrix 135 (or similarity scores 125) to select a set of N categories. Using a component for category selection 140, the product recommendation system 100 may select a set of N categories (with N being fewer than L) such that category diversity (as indicated by the pairwise similarity scores or distances) and relevance (as indicated by the aggregate target metrics) are jointly maximized. In some embodiments, the categories may be selected using a technique for sparse coding 150. The sparse coding technique 150 may use a dictionary of narrow kernels or other window functions centered at each category in a category embedding space in an effort to reconstruct or approximate the category popularity (relevance) signal with a fixed number of N positive elements. The kernels may include Gaussian kernels, uniform kernels, triangular kernels, cosine kernels, and/or other such functions. The narrow kernels may be used to quantify the influence or reminder effect of neighboring categories on each other in terms of category relevance. The sparse coding 150 may convert the distance matrix 135 to a kernelized matrix. In the kernelized matrix, each row may include a kernel centered at the category whose value decays with distance. In some embodiments, the only hyper parameter may be the standard deviation of that particular kernel.

The selected categories may be distant in the embedding space in order to enforce category diversity and variety. The sparse coding technique 150 may be used to reconstruct a sparse representation of a signal that minimizes the reconstruction error from a dictionary of atoms, which is often learned jointly together with the sparse approximation. In some embodiments, the sparse coding 150 may represent an equivalent operation to fitting an N-dimensional isotropic Gaussian mixture model (GMM) with M Gaussians in the category embedding space, but without necessarily having to perform the expensive operations of explicitly computing the N-dimensional embeddings or running an Expectation-Maximization algorithm for GMM fitting in N-dimensional space. By avoiding the need to compute category embeddings and instead using a similarity matrix or distance matrix to capture relationships between categories, the duration of the item selection may be reduced from hours to minutes.

In some embodiments, sparse coding 150 may include techniques for learning sets of over-complete bases to represent data in an efficient manner. Sparse coding 150 may attempt to find a set of basis vectors $\phi_i$ such that an input vector x can be represented as a linear combination of the basis vectors:

$$x = \sum_{i=1}^{k} a_i \phi_i.$$

A sparse coding technique 150 may learn an over-complete set of basis vectors to represent input vectors such that the basis vectors are better able to capture structures and patterns inherent in the input data. Sparse coding 150 may involve a criterion of sparsity to resolve the degeneracy introduced by over-completeness. Sparsity may be defined as having few non-zero components or having few components not close to zero. Sparse coding 150 may use a cost function or other optimization function. For example, sparse coding 150 may jointly maximize category diversity and category relevance to select a set of N categories of items in an electronic catalog.

After the N categories have been selected, a component for item selection 160 may select items from across the N selected categories. In addition to providing or referencing a list or set of the input items 105, the client may also provide inputs such as a value N representing the number of categories to be selected and/or a value M representing the number of items to be selected from each category. In some embodiments, N may be two or more while M may be one or more. If M=1, then the selected items 165 may include one item from each of the N selected categories. As shown in FIG. 1, the list or set of output items 165 may then include N items. Various ones of the N selected categories may be represented in the items 165. For example, the items 165 may be include an item $I_1$ from category $C_1$ and an item $I_K$ from category $C_L$. If M>1, then the selected items 165 may include M different lists, with each list including one item from each of the N selected categories. Clients may choose to cycle through the different lists in presenting suggested items to customers. In some embodiments, items may be selected from the selected categories according to the individual target metrics. For example, if N=7 and M=2, then the top two items (according to a ranking of items by the target metric) may be selected from each of the seven categories. In some embodiments, the selection of items 165 may exclude redundant items, e.g., the same item ID in two different categories. In some embodiments, similar categories may be clustered together into N clusters, and the top M items from each cluster may be selected. In some embodiments, categories may be partitioned into N partitions based (at least in part) on the similarity scores, and the top M items from each partition may be selected. By selecting a set of maximally diverse (but relevant) categories and then selecting the top-ranked item(s) from each category, the product recommendation system 100 may produce a set of diversified and relevant output items 165 that can be used to drive customer engagement with an electronic catalog. For example, depending on the values for M and N as well as the target metric, the selected items 165 may include a frequently repurchased item from a health products category, a frequently repurchased item from a food and grocery category, a frequently repurchased item from a baby care category, and so on.

Figure 7:
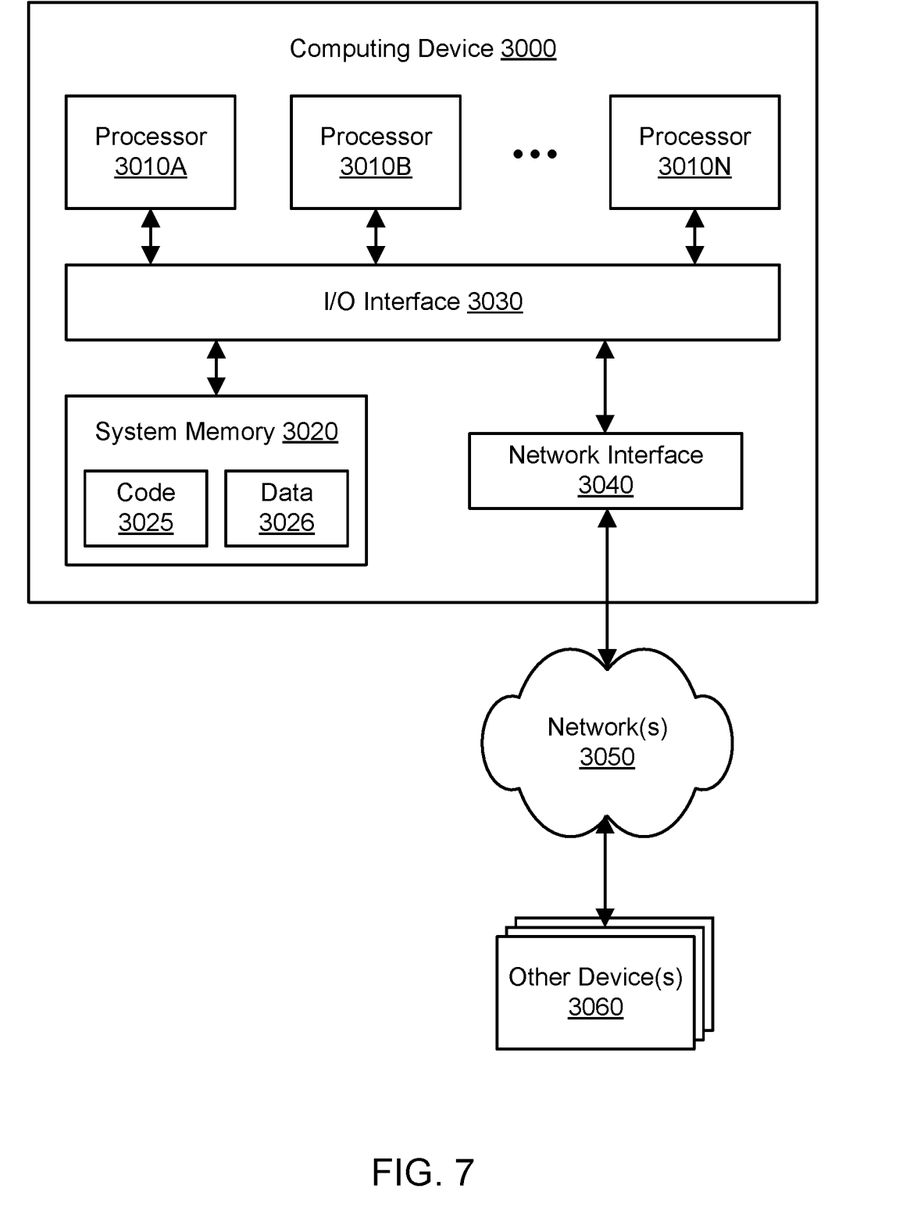
FIG. 7 illustrates an example computing device that may be used in some embodiments.

The product recommendation system 100 may be implemented using any suitable number and configuration of computing devices, any of which may be implemented by the example computing device 3000 illustrated in FIG. 7. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 may include additional components not shown, fewer components than shown, or different combinations, configurations, or quantities of the components shown.

One or more components of the system 100 may be implemented in a service-oriented system in which multiple services collaborate according to a service-oriented architecture. In such an environment, the system 100 may offer its functionality as a service to multiple clients. To enable clients to invoke its functionality, the system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the system 100 may be offered to clients in exchange for fees, or the cost associated with performing a selection of catalog items using the system 100 may be assessed to a responsible entity. In some embodiments, clients of the system 100 may represent different business entities than the entity that operates the system 100.

Components of the system 100 and its clients may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the system 100 may be implemented using computing resources of a provider network. The provider network may represent a network set up by an entity such as a company or a public-sector organization to provide one or more services (such as various types of network-accessible computing or storage) accessible via the Internet and/or other networks to a distributed set of clients. The provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. Aspects of the provider network may be hosted in the cloud, and the network may be termed a cloud-based provider network.

Figure 2:
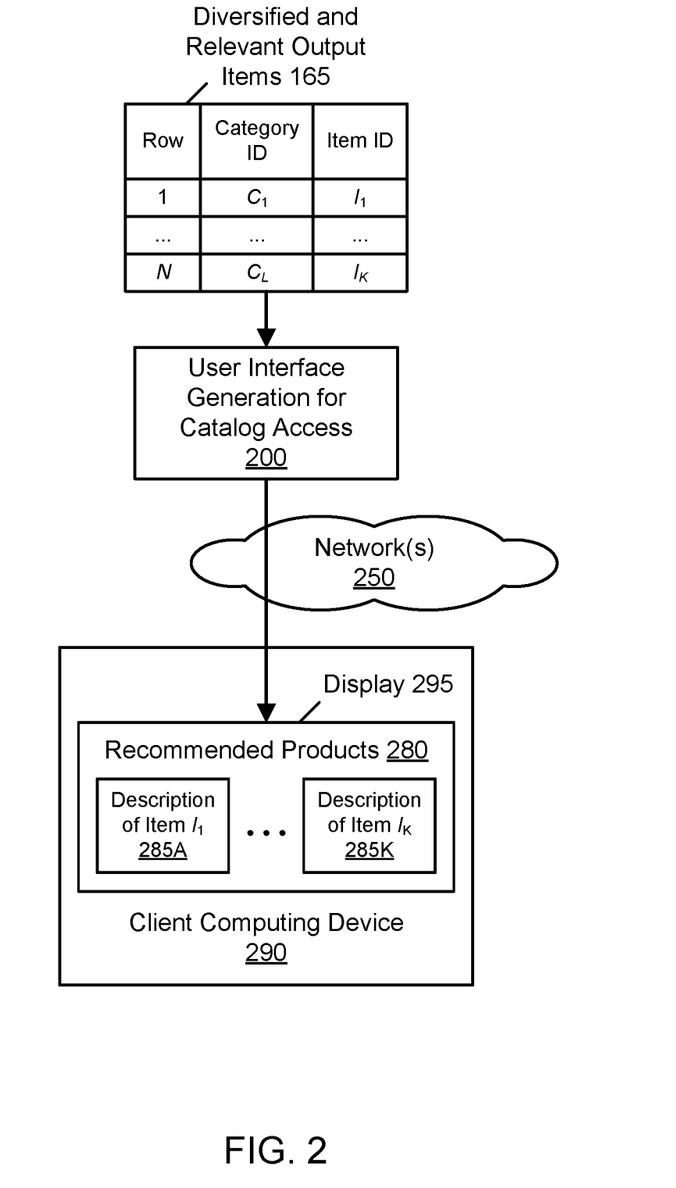
FIG. 2 illustrates further aspects of the example system environment for optimizing diversity and relevance for catalog items, including presentation of at least some of the selected items in a user interface, according to some embodiments.

FIG. 2 illustrates further aspects of the example system environment for optimizing diversity and relevance for catalog items, including presentation of at least some of the selected items in a user interface, according to some embodiments. As discussed above, by selecting a set of maximally diverse (but relevant) categories and then selecting the top-ranked item(s) from each category, the product recommendation system 100 may produce a set of diversified and relevant output items 165 that can be used to drive customer engagement with an electronic catalog. In some embodiments, the output items 165 may be used by a component for user interface generation for catalog access 200. The component 200 may be associated with a web server or other back-end system that generates a user interface that permits customers to search, browse, and make purchases from the electronic catalog. The component 200 may represent one or more services in a service-oriented system that collaborate to produce user interface elements associated with the electronic catalog. For example, the component 200 may generate a "suggested purchases" or "recommended products" pane or widget 280 on a product detail page associated with the electronic catalog.

The interface element 280 may be displayed on a display device 295 associated with a client computing device 290 operated by a customer of the electronic catalog. The interface element 280 or its contents may be sent to the client computing device 290 via one or more networks 250, e.g., the Internet. The interface element 280 may display descriptions of at least some of the selected items 165, such as a description 285A of item $I_1$ and a description 285K of item $I_K$. The diverse and relevant set of items 165 may be selected in order to optimize the display of a relatively small number of suggested items in a space-constrained user interface element 280, e.g., having a limited number of "slots" for products. Such an interface element 280 may improve the experience of customers of the electronic catalog, e.g., by allowing them to discover items they would have a higher propensity to purchase while reducing the display of irrelevant or redundant items.

Figure 3A:
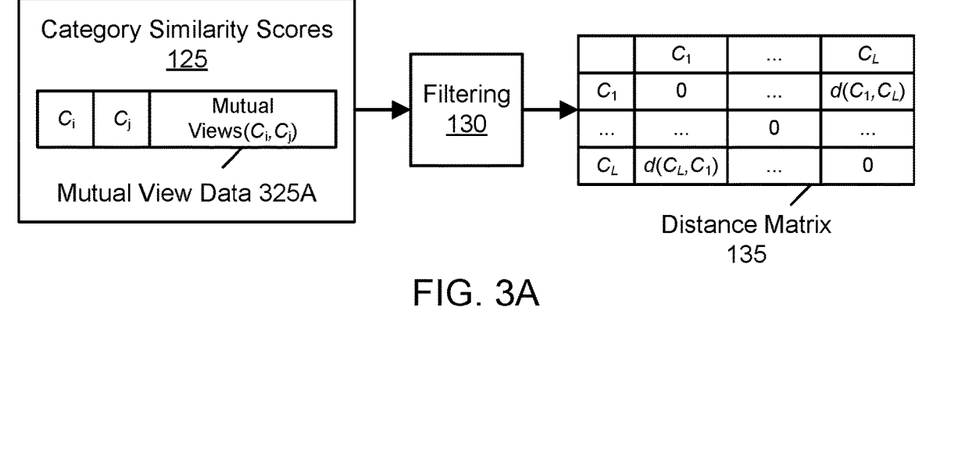
FIG. 3A illustrates further aspects of the example system environment for optimizing diversity and relevance for catalog items, including the use of mutual view data to determine similarities or distances between pairs of categories, according to some embodiments.

FIG. 3A illustrates further aspects of the example system environment for optimizing diversity and relevance for catalog items, including the use of mutual view data to determine similarities or distances between pairs of categories, according to some embodiments. In some embodiments, the similarity scores 125 or distances may be determined based (at least in part) on mutual views for pairs of categories. As shown in FIG. 3A, the mutual view data 325A may include pairwise data for pairs of categories. For a pair of categories $C_i$ and $C_j$, the mutual view data 325A may include a metric, score, or other value representing the mutual views for ($C_i$, $C_j$). Mutual views may represent a customer viewing both of the two categories (e.g., per session-day).

Figure 3B:
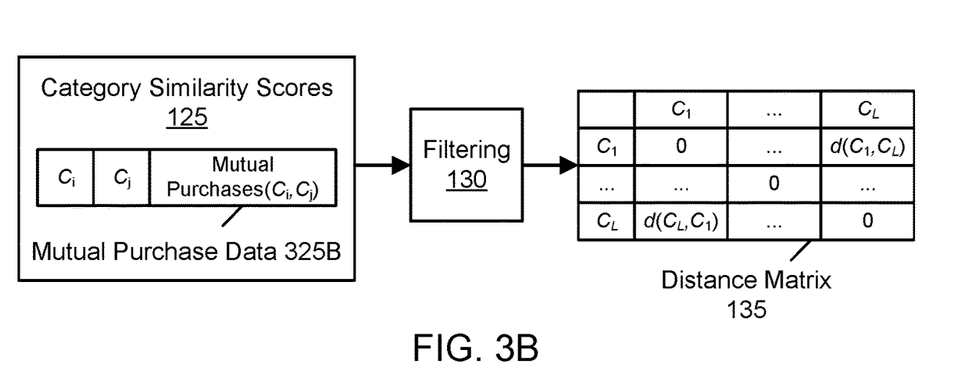
FIG. 3B illustrates further aspects of the example system environment for optimizing diversity and relevance for catalog items, including the use of mutual purchase data to determine similarities or distances between pairs of categories, according to some embodiments.

FIG. 3B illustrates further aspects of the example system environment for optimizing diversity and relevance for catalog items, including the use of mutual purchase data to determine similarities or distances between pairs of categories, according to some embodiments. In some embodiments, the similarity scores 125 or distances may be determined based (at least in part) on mutual purchases for pairs of categories. As shown in FIG. 3B, the mutual purchase data 325B may include pairwise data for pairs of categories. For a pair of categories $C_i$ and $C_j$, the mutual purchase data 325B may include a metric, score, or other value representing the mutual purchases for ($C_i$, $C_j$). Mutual purchases may represent a customer purchasing from both of the two categories (e.g., per session-day).

Figure 4:
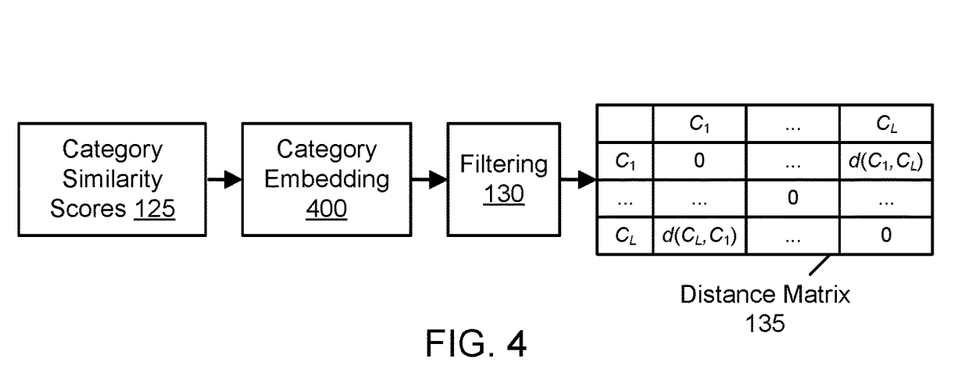
FIG. 4 illustrates further aspects of the example system environment for optimizing diversity and relevance for catalog items, including generating category embeddings in an embedding space, according to some embodiments.

FIG. 4 illustrates further aspects of the example system environment for optimizing diversity and relevance for catalog items, including generating category embeddings in an embedding space, according to some embodiments. In some embodiments, the system 100 may include a component 400 for generating category embeddings in an embedding space, and the category embeddings may be used to generate the distance matrix 135. The category embeddings 400 may be generated based (at least in part) on the pairwise category similarity scores 125. The category embeddings may be determined based (at least in part) on conditional probabilities of mutual views. The calculation of category embeddings may computationally expensive and may be performed relatively infrequently, e.g., once per month.

The similarity scores 125 may be converted to a matrix C in which an entry $C_{ij}$ represents the similarity (e.g., mutual views) between the categories $C_i$ and $C_j$. The matrix C may be converted to a similarity matrix S in which an entry $S_{ij}$ is the complement of the conditional probability $P(C_i|C_j)$ of visiting $C_i$ given that $C_j$ was visited in the same day. The matrix S may be calculated according to Bayes' rule as follows:

$$S_{ij} = 1 - P(C_i | C_j) = 1 - \frac{P(C_i, C_j)}{P(C_j)} = 1 - \frac{P(C_i, C_j)}{P(C_j, C_j)} = 1 - \frac{\frac{V_{ij}}{\Sigma_{\forall(i,j)} V_{ij}}}{\frac{V_{jj}}{\Sigma_{\forall(i,j)} V_{ij}}},$$

where $P(C_i, C_j) = P(C_j)$. Because $P(C_i|C_j) \ne P(C_j|C_i)$, S is not symmetric. The lack of symmetry may cause contradictions during the embedding generation, and so the symmetrized matrix $$\tilde{S} = \frac{S + S^T}{2}$$

may be generated, where each entry corresponds to:

$$\tilde{S}_{ij} = 1 - \frac{P(C_i | C_j) + P(C_j | C_i)}{2}.$$

Figure 5:
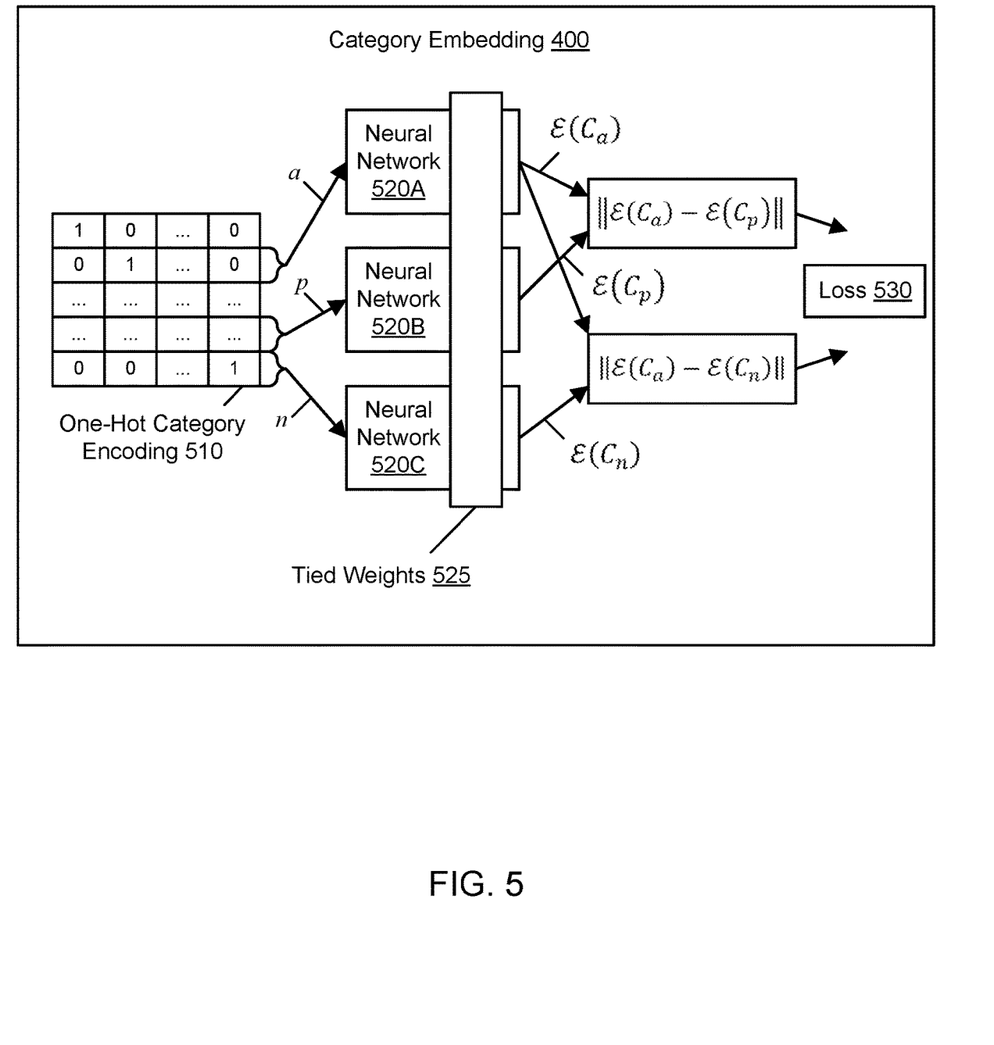
FIG. 5 illustrates further aspects of the example system environment for optimizing diversity and relevance for catalog items, including generating category embeddings using a triplet neural network, according to some embodiments.

FIG. 5 illustrates further aspects of the example system environment for optimizing diversity and relevance for catalog items, including generating category embeddings using a triplet neural network, according to some embodiments. The matrix $\tilde{S}$ may not represent a distance matrix because triplets of entries may violate the triangle inequality. Because it may not be possible to generate embeddings through Siamese networks generating points whose distance mimics the entries in $\tilde{S}$, the system 100 may generate ordinal embeddings through a triplet network as shown in FIG. 5. The triplet network may include neural networks 520A, 520B, and 520C as well as tied weights 525. The triplet network may read a batch of triplet indices (a, p, n) such that $\tilde{S}_{ap} > \tilde{S}_{an}$. The indices may refer to the one-hot encoding 510 of all categories present in $\tilde{S}$. Because exhaustive enumeration of all triplets may grow cubically with the number of categories, a sampling strategy may be used. Triplets may be sampled with weights inversely proportional to their pairwise distance distribution to help maintain the loss 530 gradient in an ideal range during training. In one embodiment, for each batch, the a indices may be sampled uniformly from the rows of $\tilde{S}$. For each index, a histogram may be computed of the similarities in its row, e.g., as binned with bin size=0.01. Sampling weights may then be derived from the inverse of the histogram, so that p and n are sampled uniformly with respect to the similarity values to yield well-distributed triplets.

In some embodiments, the network itself may represent a simple stacked network of six layers, each with 64 nodes, in addition to a final layer where the number of nodes corresponds to the dimensionality of the embedding. Given the triplet embeddings $\varepsilon(C_a)$, $\varepsilon(C_p)$, $\varepsilon(C_n)$, the network may minimize the following loss function:

$$\mathcal{L}_{(a,p,n)} = \max(\|\varepsilon(C_a) - \varepsilon(C_p)\| - \|\varepsilon(C_a) - \varepsilon(C_n)\| + \alpha, 0),$$

where α represents a separation margin empirically set to 0.005.

In some embodiments, the sparse coding 150 may take as inputs an L×1 vector m with the aggregate target metric values for each category, as well as an L×L pairwise Euclidean distance matrix D between categories calculated from the embeddings. To find the most representative vector b*, the sparse coding problem may be solved as follows:

$$b^* = \underset{b}{\text{argmin}} \frac{1}{2} \|m - \tilde{D}b\|_2^2 + \lambda \|b\|_1 \quad \text{s.t.} \quad \|b\|_0 \leq N,$$

where b* will be nonzero for the indices corresponding to the chosen categories. The missing term to solve the problem in the previous equation is the dictionary $\tilde{D}$. This dictionary may be an L×L matrix where the $i^{th}$ row represents the atom for the $i^{th}$ category $C_i$. Each atom may represent the value of a symmetric decaying kernel centered at $\varepsilon(C_i)$, which may be represented as a normal distribution $N(\varepsilon(C_i), \sigma^2)$. The value of the kernel for entry $D_{ij}$ may be calculated according to the distance between $C_i$ and $C_j$ stored in the distance matrix D. This may allow the problem to be discretized to avoid working in an arbitrarily high-dimensional embedding space, and it may correspond to approximating the m as a function of $\varepsilon(C_i)$ by a mixture of N isotropic kernels (e.g., Gaussian kernels), each centered at a different browse node $C_j$. The hyperparameter σ may relate the variance of the kernel with how well the function value of a distant neighbor is related to a browse node. To find the optimal value, an upper bound may be imposed on σ equal to the largest distance found in D, and a binary search may be performed. To determine the direction of the search at each step, the reconstruction error $$E = \|m - \tilde{D}b^*\|_2^2$$

may be examined and decomposed into two portions $E^+$ and $E^-$ corresponding to elements where m−Db>0 and m−Db<0, respectively. If $E^+>E^-$, we may assume that the kernel variance is too small as the reconstruction will look like a set of sharp spikes, and the search may be continued to the right of the binary split. If $E^+<E^-$, the search may be continued to the left of the binary split. The search may be stopped once a local minimum is reached.

Figure 6:
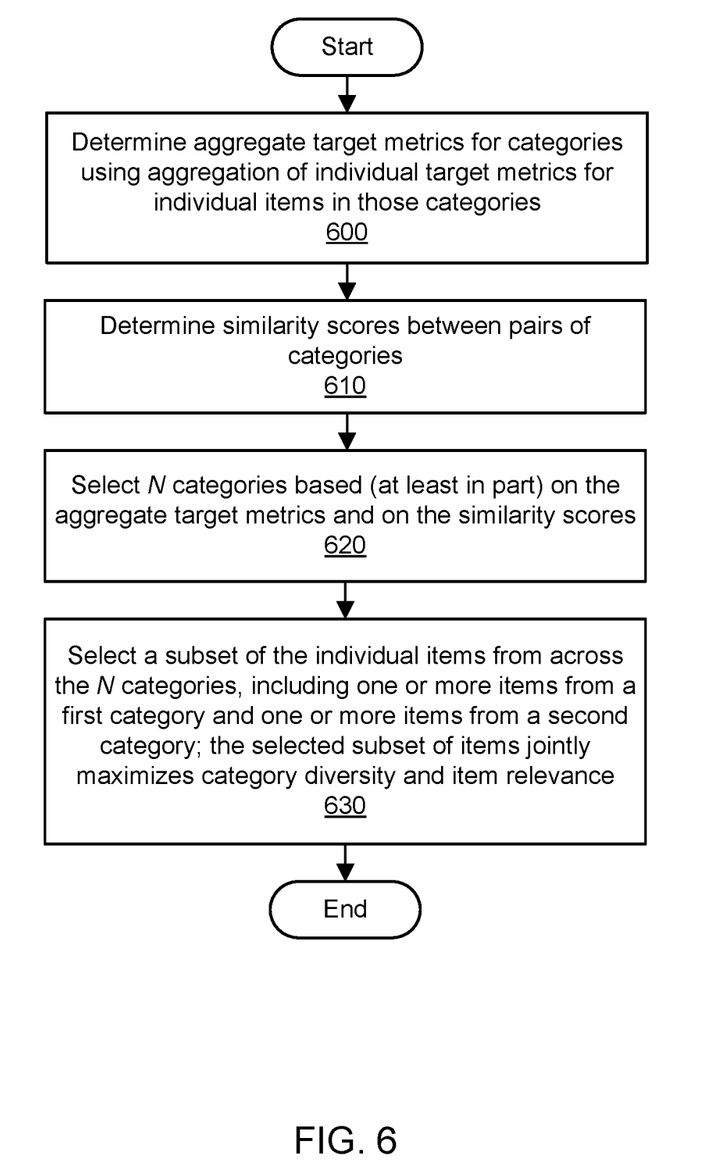
FIG. 6 is a flowchart illustrating a method for optimizing diversity and relevance for catalog items, according to some embodiments.

FIG. 6 is a flowchart illustrating a method for optimizing diversity and relevance for catalog items, according to some embodiments. As shown in 600, the method may determine aggregate target metrics for a set of categories of an electronic catalog. The aggregate target metrics may be generated using aggregation of individual items in those categories. In some embodiments, a client may request the selection of items from a set of input items in order to provide a diverse and relevant list of recommended products to users. Identifiers of the input items may be provided as input along with target metrics for those item IDs. In some embodiments, each of the input items may be associated with a target metric. A target metric for an item may tend to indicate that item's relevance to customers. A target metric may be based on frequency of repurchase, aggregate revenue over a period of time, a total number of purchased units, and/or other indicators of item relevance. The aggregate target metric for a category may tend to indicate that category's relevance to customers in comparison to other categories.

As shown in 610, the method may determine similarity scores between pairs of categories. The similarity scores may indicate similarities between pairs of categories determined by the target metric aggregation. The similarity score for a pair of categories may tend to indicate the distance between the two categories. For example, a similarity score for the mobile phone category and a health products category may indicate a lower similarity or higher distance, while a similarity score for the mobile phone category and the electronics category may indicate a higher similarity or lower distance. In some embodiments, the similarity scores may be based (at least in part) on analysis of a category hierarchy. However, in some embodiments, similarity scores may be generated on other data. In some embodiments, the similarity scores or distances may be determined based (at least in part) on mutual views for pairs of categories, mutual purchases for pairs of categories (e.g., per session-day), and so on. The similarity scores 125 may be used to compute category embeddings 400 in an embedding space in some embodiments. In some embodiments, the method may perform filtering on the category similarity scores, e.g., in order to remove pairs of categories whose distance exceeds a threshold value or otherwise to create a more focused set of similarity scores. In some embodiments, the method may generate a distance matrix or similarity matrix based (at least in part) on the similarity scores. In some embodiments, the distance matrix may be determined using item category embeddings in an embedding space, where the item category embeddings are determined based (at least in part) on conditional probabilities of mutual views. In some embodiments, the method may determine a kernelized matrix based (at least in part) on the distance matrix. The kernelized matrix may represent neighboring relationships between the item categories using respective kernels or windows centered at locations of at least some of the item categories.

As shown in 620, the method may select N categories based (at least in part) on the aggregate target metrics and (at least in part) on the similarity scores. Using a component for category selection 140, the product recommendation system 100 may select a set of N categories (with N being fewer than L) such that category diversity (as indicated by the pairwise similarity scores or distances) and relevance (as indicated by the aggregate target metrics) are jointly maximized. In some embodiments, the categories may be selected using a technique for sparse coding. The sparse coding technique may use a dictionary of narrow kernels centered at each category in a category embedding space in an effort to reconstruct the category popularity signal with a fixed number of N positive elements. The selected categories may be distant in the embedding space in order to enforce category diversity and variety. The sparse coding technique may be used to reconstruct a sparse representation of a signal that minimizes the reconstruction error from a dictionary of atoms, which is often learned jointly together with the sparse approximation.

As shown in 630, the method may select a subset of the individual items from across the N categories. The selected items may include one or more items from a first category of the N categories and one or more items from a second category of the N categories. The categories and items may be selected to jointly maximize category diversity and item relevance. In addition to providing or referencing a list or set of the input items, the client may also provide inputs such as a value N representing the number of categories to be selected and/or a value M representing the number of items to be selected from each category. In some embodiments, items may be selected from the selected categories according to the individual target metrics. For example, if N=7 and M=2, then the top two items (according to a ranking of items by the target metric) may be selected from each of the seven categories. By selecting a set of maximally diverse (but relevant) categories and then selecting the top-ranked item (s) from each category, the product recommendation system 100 may produce a set of diversified and relevant output items 165 that can be used to drive customer engagement with an electronic catalog.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more processors and one or more memories to store computer-executable instructions that, if executed, cause the one or more processors to:
   determine respective target metrics for a plurality of item categories, wherein a first item category of the plurality of item categories includes a first set of items in an electronic catalog, wherein the respective target metric for the first item category is determined using aggregation of individual target metrics for the first set of items, wherein a second item category of the plurality of item categories includes a second set of items in the electronic catalog, wherein the respective target metric for the second item category is determined using aggregation of individual target metrics for the second set of items;
   determine a distance matrix comprising respective distances between pairs of the item categories, wherein the distance matrix represents neighboring relationships between the item categories;
   using a sparse coding technique, select N item categories from the plurality of item categories based at least in part on the respective target metrics and based at least in part on the distance matrix, wherein the N item categories are selected to jointly optimize category diversity according to the distance matrix and relevance according to the respective target metrics;
   select a third set of items in the electronic catalog from across the N item categories, wherein the third set of items comprises at least one of the first set of items and at least one of the second set of items; and
   generate a user interface element descriptive of at least some of the third set of items, wherein the user interface element is displayed in a user interface associated with the electronic catalog.

2. The system as recited in claim 1, wherein the respective target metrics represent frequency of repurchase, and wherein the aggregation of the individual target metrics for the first set of items comprises determining an average frequency of repurchase across the first set of items.

3. The system as recited in claim 1, wherein the distance matrix is determined using item category embeddings in an embedding space, and wherein the item category embeddings are determined based at least in part on conditional probabilities of mutual views.

4. The system as recited in claim 1, wherein the third set of items from across the N item categories comprise a respective M items from each of the N item categories, wherein the M items for a particular item category are selected based at least in part on a target metric.

5. A computer-implemented method, comprising:
   determining respective target metrics for a plurality of categories comprising a plurality of items in an electronic catalog, wherein a first category of the plurality of categories comprises a first subset of the plurality of items in the electronic catalog, wherein a second category of the plurality of categories comprises a second subset of the plurality of items in the electronic catalog, and wherein the respective target metric for the first category is determined using aggregation of individual target metrics for the first subset of the plurality of items in the electronic catalog;
   determining respective similarity scores between pairs of the categories, wherein the respective similarity scores between the pairs of the categories are represented using a distance matrix, wherein the distance matrix is determined using category embeddings in an embedding space, and wherein the category embeddings are determined based at least in part on conditional probabilities of mutual views;
   selecting N categories from the plurality of categories based at least in part on the respective target metrics for the plurality of categories, and based at least in part on the respective similarity scores between the pairs of the categories, wherein the N categories are selected to optimize category diversity according to the respective similarity scores and relevance according to the respective target metrics;
   selecting a third subset of the plurality of items from across the N categories that were selected based at least in part on the respective target metrics for the plurality of categories and the respective similarity scores between the pairs of the categories, wherein the third subset comprises at least one item from the first subset, and at least one item from the second subset; and
   generating a user interface element descriptive of at least some of the third subset of the plurality of items, wherein the user interface element is displayed in a user interface associated with the electronic catalog.

6. The method as recited in claim 5, wherein the respective target metrics represent frequency of repurchase, and wherein the aggregation of the individual target metrics for the first subset of the plurality of items comprises determining an average frequency of repurchase across the first subset of the plurality of items.

7. The method as recited in claim 5, wherein the N categories are selected from the plurality of categories using a sparse coding technique.

8. The method as recited in claim 5, wherein the respective similarity scores between the pairs of the categories are determined based at least in part on mutual views or mutual purchases between the pairs.

9. The method as recited in claim 5, further comprising:
filtering the distance matrix to remove a plurality of pairs of categories whose distance exceeds a threshold value.

10. The method as recited in claim 9, wherein the filtering the distance matrix comprises:
determining a kernelized matrix based at least in part on the distance matrix, wherein the kernelized matrix represents neighboring relationships between the categories using respective kernels centered at locations of at least some of the categories.

11. The method as recited in claim 5, wherein the N categories are selected to jointly maximize category diversity according to the respective similarity scores and item relevance according to the respective target metrics.

12. One or more non-transitory computer-readable storage media storing program instructions that, when executed on or across one or more processors, perform:
determining respective target metrics for a plurality of item categories comprising a plurality of items in an electronic catalog, wherein a first item category of the plurality of item categories comprises a first subset of the plurality of items in the electronic catalog, wherein a second item category of the plurality of item categories comprises a second subset of the plurality of items in the electronic catalog, and wherein the respective target metric for the first item category is determined using aggregation of individual target metrics for the first subset of the plurality of items in the electronic catalog;
determining respective distances between pairs of the item categories;
selecting N item categories from the plurality of item categories based at least in part on the respective target metrics for the plurality of item categories, and based at least in part on the respective distances between the pairs of the item categories, and wherein the N categories are selected from the plurality of categories using a sparse coding technique;
selecting a third subset of the plurality of items from across the N item categories, wherein the third subset comprises at least one item from the first subset and at least one item from the second subset, and wherein the third subset is selected to maximize category diversity and item relevance; and
generating a user interface element descriptive of at least some of the third subset of the plurality of items, wherein the user interface element is displayed in a user interface associated with the electronic catalog.

13. The one or more non-transitory computer-readable storage media as recited in claim 12, wherein the respective target metrics represent frequency of repurchase, and wherein the aggregation of the individual target metrics for the first subset of the plurality of items comprises determining an average frequency of repurchase across the first subset of the plurality of items.

14. The one or more non-transitory computer-readable storage media as recited in claim 12, wherein the respective distances between the pairs of the item categories are determined based at least in part on mutual views or mutual purchases between the pairs.

15. The one or more non-transitory computer-readable storage media as recited in claim 12, wherein the respective distances between the pairs of the item categories are represented using a Euclidean distance matrix, wherein the Euclidean distance matrix is determined using item category embeddings in an embedding space, and wherein the item category embeddings are determined based at least in part on conditional probabilities of mutual views.

16. The one or more non-transitory computer-readable storage media as recited in claim 15, further comprising additional program instructions that, when executed on or across the one or more processors, perform:
determining a kernelized matrix based at least in part on the Euclidean distance matrix, wherein the kernelized matrix represents neighboring relationships between the item categories using respective kernels centered at locations of at least some of the item categories.

17. The one or more non-transitory computer-readable storage media as recited in claim 12, wherein the third subset of the plurality of items comprises M lists of N items.

* * * * *